Dec. 25, 1934.     L. R. BUCKENDALE     1,985,815
AUTOMOTIVE DRIVING AXLE
Filed Dec. 10, 1932     3 Sheets-Sheet 1
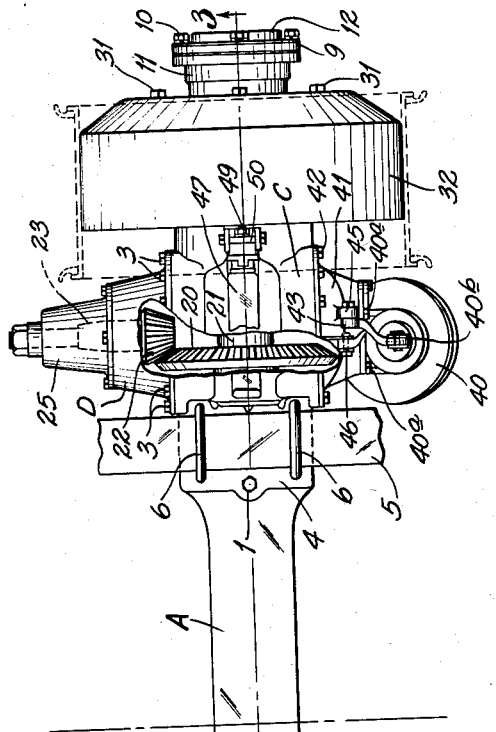
INVENTOR:
Laurence R. Buckendale,
HIS ATTORNEYS.

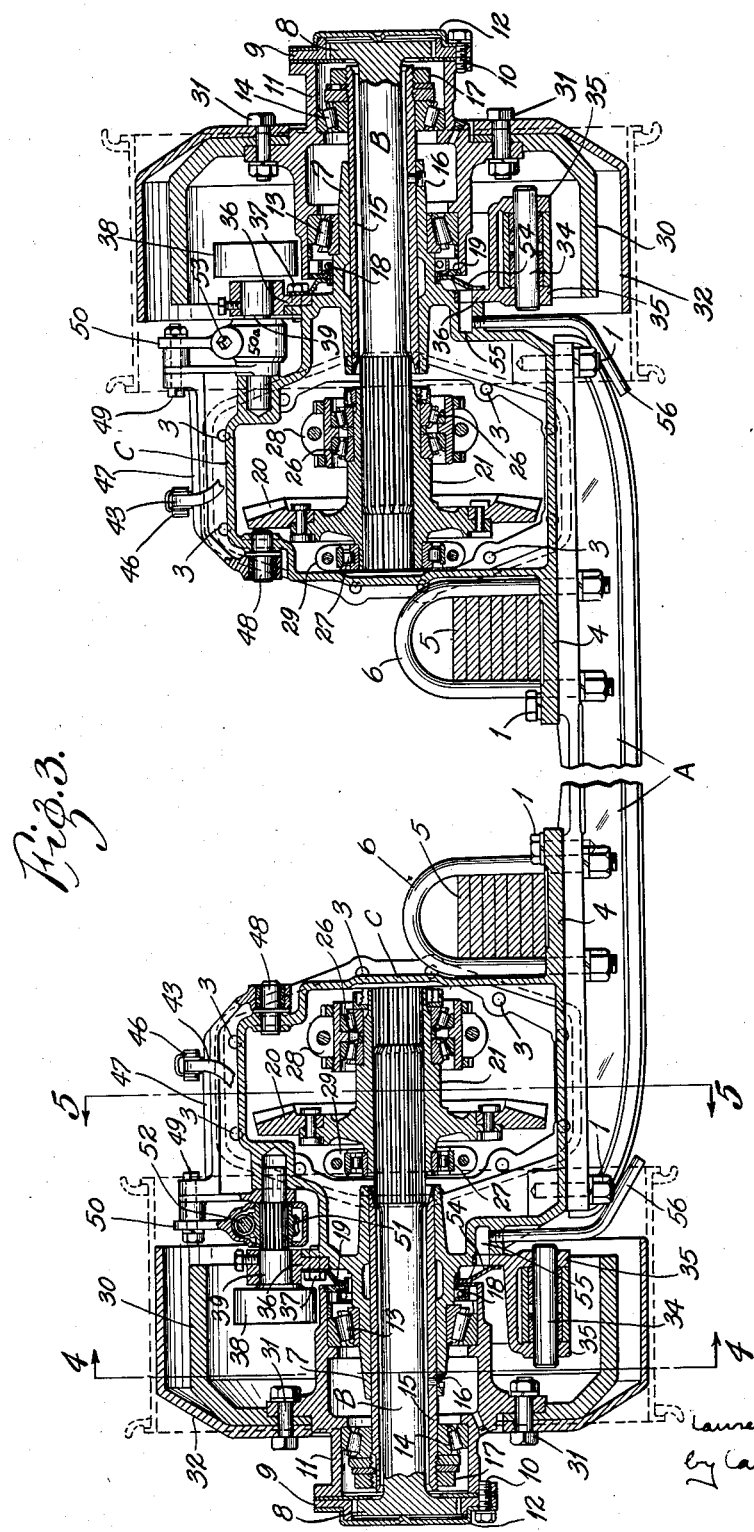

Dec. 25, 1934.  L. R. BUCKENDALE  1,985,815
AUTOMOTIVE DRIVING AXLE
Filed Dec. 10, 1932  3 Sheets-Sheet 3
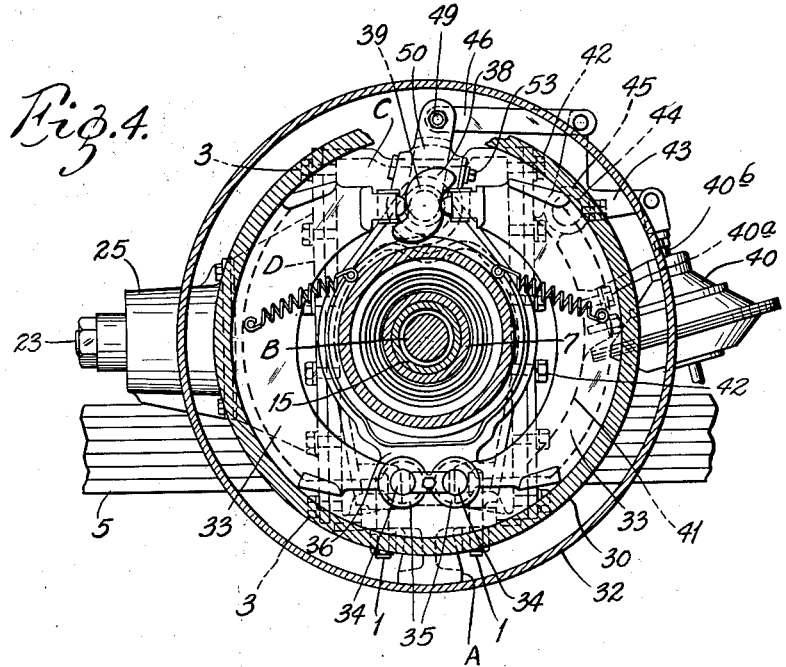
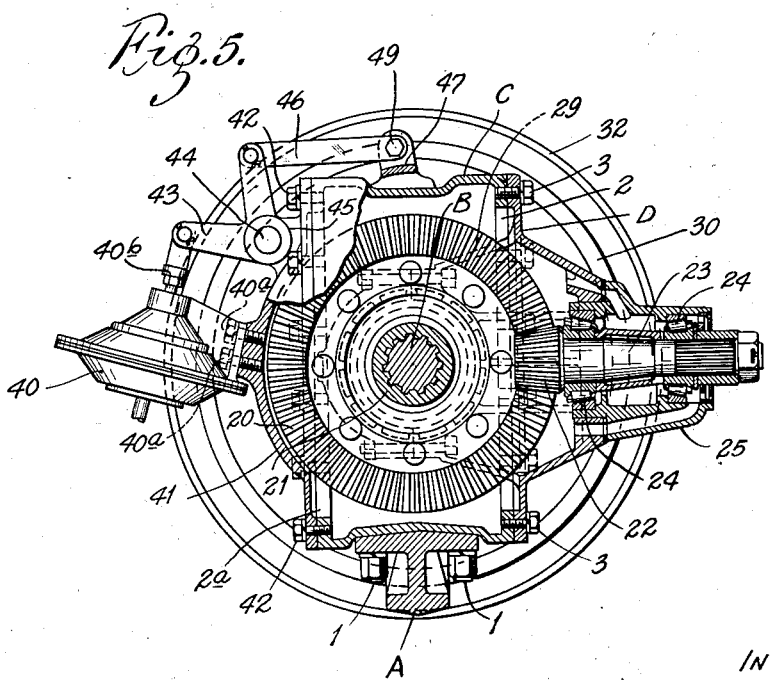
INVENTOR:
Laurence R. Buckendale,
by Cantlan & Gravely,
HIS ATTORNEYS.

Patented Dec. 25, 1934

1,985,815

UNITED STATES PATENT OFFICE 1,985,815

AUTOMOTIVE DRIVING AXLE

Laurence R. Buckendale, Detroit, Mich., assignor to The Timken-Detroit Axle Company, Detroit, Mich., a corporation of Ohio Application December 10, 1932, Serial No. 646,612

5 Claims. (Cl. 180—70)

This invention relates to automotive driving axles of the kind wherein the wheels are independently driven by separate bevel gear sets enclosed within housings mounted on the ends of the load supporting axle. The principal objects of the present invention are to dispense with the use of right and left hand gears for driving the respective wheels; to provide duplicate parts at the opposite ends of the axle which may be freely interchanged; to facilitate assembly and disassembly of the parts; to provide for the proper housing, lubrication and support of the gearing and live axle shafts and to produce a strong, compact and durable axle. The invention consists in the automotive driving axle and in the construction, combinations and arrangements of parts hereinafter described and claimed.

In the accompanying drawings, which form part of this specification and wherein like symbols refer to like parts wherever they occur, Fig. 1 is a plan view of an automotive driving axle construction embodying my invention;

Fig. 2 is a rear elevation of said driving axle construction;

Fig. 3 is a vertical central longitudinal section on the line 3—3 in Fig. 1;

Fig. 4 is a vertical transverse section on the line 4—4 in Fig. 3; and

Fig. 5 is a vertical transverse section on the line 5—5 in Fig. 3.

My axle belongs to the type of automotive driving axle known as a drop axle and comprises a fixed load supporting beam or axle A provided at each end with a full floating live axle shaft B that is located above and extends beyond the fixed axle and is preferably driven by a separate power unit.

In the present driving axle construction, the fixed axle A is preferably of I-shaped cross-section; and each axle shaft B is mounted in a bracket or housing member C that is removably secured by stud bolts 1 to a seat provided therefor at each end of said fixed axle. The housing member C is provided with a chamber adapted to receive through an opening 2 in the front wall thereof a bevel gear set for driving the axle shaft in said housing. A gear carrier D is removably secured by cap screws 3 to the front wall of the housing member C and supports the bevel drive gear set for the axle shaft B, said gear carrier covering the gear receiving opening in said front wall of said housing member. The housing member C is provided at its inner lower corner with an inwardly extending base flange 4, which forms a spring seat to which a body supporting side spring 5 is secured by means of the usual U-bolts 6.

The axle shaft B extends through a tubular projection 7 on the outer end wall of the housing member C and is provided at its outer end with a driving disk 8, which interlocks with an annular driving plate 9 that is removably secured by cap screws 10 to the outer end of a tubular wheel hub 11 that surrounds the outer end portion of the tubular portion of said housing member. The cap screws 10 also serve to secure a hub cap or cover plate 12 to the outer end of the wheel hub 11. The wheel hub 11 is journaled in antifriction bearings, preferably inner and outer tapered roller bearings 13 and 14, respectively. The inner bearing 13 is interposed between the inner end portion of the wheel hub 11 and the tubular portion 7 on the housing member C; and the outer bearing 14 is interposed between the outer end portion of said wheel hub and the projecting outer end portion of a sleeve 15 that is removably secured within said tubular portion, preferably by means of one or more screw studs 16. The bearings 13 and 14 are adjusted by means of an adjusting nut 17 threaded on the outer end of the sleeve 15 in abutting relation to the cone or inner raceway member of the outer bearing 14. A suitable oil seal 18 is mounted on the tubular axle shaft receiving portion 7 of the housing member C for preventing the escape of oil from said housing at this point; and likewise, the inner end of the wheel hub 11 is equipped with a suitable oil seal 19 for preventing the escape of oil therefrom.

The bevel gearing for driving each axle shaft B comprises a large bevel driven gear 20, which has an elongated hub 21 splined on the inner end of said shaft, and a bevel driving pinion 22, which is mounted on the inner end of a pinion shaft 23 journaled in suitable antifriction bearings 24 mounted in a forwardly projecting nose portion 25 of the gear carrier D. The elongated hub portion 21 of the large bevel driven gear 20 is journaled at its opposite ends in antifriction bearings 26 and 27 seated in pedestals or boxes 28 and 29, respectively, that extend rearwardly from the gear carrier D into the chamber in the housing member C through the opening 2 in the front wall thereof. Preferably both of these pedestals are split to facilitate mounting of the large driven bevel gear 20 in the carrier. The antifriction bearing 26 on the pinion side of the large bevel driven gear 20 preferably comprises a double conical roller bearing; and the antifriction bearing 27 located on the other or rear side of said gear preferably comprises a cylindrical roller bearing. By this arrangement, the bevel gearing is journaled in the gear carrier D in proper intermeshed relation and is removable from the housing member C with the gear carrier as a unit by withdrawing the axle shaft B endwise from the elongated hub 21 of the bevel gear 20.

A brake drum 30 is removably secured to the wheel hub 11 by means of bolts 31, which also serve to secure the disk portion 32 of the road wheel to said hub. Cooperating with the inner surface of the brake drum 30 is a pair of brake shoes 33 that are pivoted at one end upon pins 34 mounted in lugs 35 on an annular brake spider 36 that is removably secured to the outer end of the housing member C by means of cap screws 37. The brake shoes 33 are operated by means of a suitable cam 38 on a shaft 39 journaled in a bearing provided therefor in the brake spider 36. The cam shaft 39 is preferably actuated by means of a fluid motor 40 which is removably secured by cap screws 40a to a cover plate 41, which is removably secured by cap screws 42 to the rear wall of the housing member C and closes the opening 2a therein. The fluid motor 40 has a stem 40b operatively connected to one arm of a lever 43 journaled on a pin 44 fixed to an outstanding lug 45 on the back of the rear cover plate 41. The other arm of the lever 43 is pivotally connected to one end of a link 46 whose other end is pivotally connected to a yoke 47, which straddles the top of the housing member C. One branch of the yoke 47 is journaled on a stud 48 mounted in a recess provided therefor in the inner end wall of the housing member C; and the other branch of said yoke is journaled on the cam shaft 39, and is also connected by means of a bolt 49 to the outer end of an arm 50 having a hub 50a, which surrounds and is rotatably supported on the hub of a worm wheel 51 fixed to said cam shaft. The arm 50 is normally prevented from turning on the worm wheel 51 by means of a worm 52 whose shaft projects from said hub and provides means for adjusting the arm 50 with respect to the worm wheel. The worm shaft is locked in the desired position of adjustment by means of a nut 53 threaded thereon.

Any oil that escapes from the inner end of the wheel hub 11 is delivered by an oil slinger ring 54 on the brake spider 36 into a recess 55 in the housing member and is discharged from said recess through a pipe 56 at a point clear of the brake drum, thereby preventing such oil from reaching the brake shoes and interfering with the operation of the brake.

The opening 2a in the rear wall of each housing member C is located opposite to and is the same size and shape as the opening 2 in the front wall of said housing member. The cap screws 42 that secure the cover plate 41 to the rear wall of each housing member C are of the same size and are spaced apart the same distance as the cap screws 3 which secure the gear carrier D to the front wall of said housing. Thus, the bevel drive gearing may be inserted within the chamber in either housing member C through either the front or rear opening therein, and the cover plates 41 may be used to cover either of said openings. By this arrangement, it will be seen that a rear axle assembly is provided in which identically formed parts may be used at opposite ends of the axle. In the construction shown, the two housing members C are merely turned end for end with respect to each other with the gear carriers D covering the openings in the front of the housing members and with the covers 41 covering the openings in the rear of said housing member. This arrangement of the parts at the opposite ends of the axles locates the bevel gearing in the proper position for driving both axle shafts B in the same direction; and it also locates the fluid motors and the other brake actuating parts for each wheel in substantially the same positions relative to the longitudinal center line of the vehicle. By this arrangement, the use of right and left hand parts, patterns, jigs, tools and different machine operations are dispensed with, thereby materially reducing the cost of manufacture as well as reducing the number of parts that are carried in stock by the manufacturer and dealer.

The work of mounting and dismounting and adjusting of the parts is greatly simplified by my invention, and it provides a construction that is more compact and strong and less liable to get out of order than earlier constructions. The construction also has the important advantage that it permits the gearing to be removed from the housing member without removing the wheel, its bearings or the vehicle spring, merely by withdrawing the axle shaft from the hub of the large bevel driven gear and by removing the cap screws which secure the carrier for said gear to said housing member.

What I claim is:

1. An automotive driving axle construction comprising a fixed axle, duplicate housings mounted on the ends of said fixed axle, the inner ends of the respective housings being integral with the bodies thereof, duplicate axle shafts mounted in the respective housings, interchangeable sets of bevel gearing mounted in said housings for driving the axle shafts therein, the drive gears of both sets operating in the same direction, each of said housings having openings in its opposite walls through which the set of bevel gearing therefor may be inserted in and removed from said housing, and a carrier for said set of gearing adapted to be secured to either of said walls to close the opening therein.

2. An automotive driving axle construction comprising a fixed axle, duplicate housings mounted on the ends of said fixed axle, duplicate axle shafts mounted in the respective housings, interchangeable sets of bevel gearing mounted in said housings for driving the axle shafts therein, the drive gears of both sets operating in the same direction, each of said housings having openings in its opposite walls through which the set of bevel gearing therefor may be inserted in and removed from said housing, a cover plate, and a carrier for said set of bevel gearing, each of said cover plate and said carrier being adapted to be secured to either of said housing walls to close the opening therein.

3. An automotive driving axle construction comprising a fixed axle, duplicate housing members mounted on the ends of said fixed axle and having openings in opposite walls of substantially the same size and shape, duplicate axle shafts mounted in the respective housings, duplicate bevel gear sets mounted in the respective housings for driving the axle shafts therein and insertable in and removable from said housings through either opening therein, the drive gears of both sets operating in the same direction, duplicate carriers for supporting said gear sets and for covering the openings in one wall of the respective housings, and duplicate cover plates for covering the openings in the other wall of the respective housings, said carriers and said cover plates being each adapted to cover the opening in either wall of either housing.

4. A drive wheel mounting for vehicles comprising a fixed axle, a housing detachably secured on said axle, a road wheel, means on said housing for rotatably mounting said wheel, a live axle projecting into said housing and being removable without disturbing said wheel in its mounting means, means detachably and drivingly connecting said live axle to said wheel, an opening in the front wall of said housing, a cover plate for said opening, a driving bevel gear and a pinion associated as a unit and insertable in and removable from said housing through said opening, said driving gear and pinion being mounted on said cover plate and removable with the latter as a unit, said driving gear and said live axle being detachably interconnected for driving engagement, whereby, upon disconnecting said live axle from said driving gear, said driving gear and pinion may be readily removed from and inserted within said housing, through said opening.

5. The combination of claim 4 wherein said housing is provided with an opening in the rear wall thereof, and a cover plate for said rear opening, said two cover plates being interchangeable.

LAURENCE R. BUCKENDALE.